US010635193B2

United States Patent
Wakuda et al.

(10) Patent No.: US 10,635,193 B2
(45) Date of Patent: Apr. 28, 2020

(54) OPERATION DEVICE

(71) Applicant: ALPS ALPINE CO., LTD., Tokyo (JP)

(72) Inventors: Hiroshi Wakuda, Miyagi (JP);
Kazuhiko Hiratsuka, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 42 days.

(21) Appl. No.: 15/956,256

(22) Filed: Apr. 18, 2018

(65) Prior Publication Data

US 2018/0239443 A1 Aug. 23, 2018

Related U.S. Application Data

(63) Continuation of application No. PCT/JP2016/074942, filed on Aug. 26, 2016.

(30) Foreign Application Priority Data

Oct. 28, 2015 (JP) .................. 2015-211560

(51) Int. Cl.
| | | |
|---|---|---|
| G06F 3/038 | (2013.01) | |
| G06F 3/0354 | (2013.01) | |
| G06F 3/041 | (2006.01) | |
| G06F 3/0338 | (2013.01) | |
| G06F 3/044 | (2006.01) | |

(52) U.S. Cl.
CPC ............ *G06F 3/0354* (2013.01); *G06F 3/038* (2013.01); *G06F 3/0338* (2013.01); *G06F 3/03547* (2013.01); *G06F 3/044* (2013.01); *G06F 3/0414* (2013.01); *G06F 2203/04105* (2013.01)

(58) Field of Classification Search
CPC combination set(s) only.
See application file for complete search history.

(56) References Cited

U.S. PATENT DOCUMENTS

| 5,510,813 A | 4/1996 | Makinwa et al. |
| 8,773,383 B2 | 7/2014 | Yamamoto et al. |
| 2011/0175845 A1 | 7/2011 | Honda et al. |

(Continued)

FOREIGN PATENT DOCUMENTS

| JP | H07-064725 | 3/1995 |
| JP | 2003-196026 | 7/2003 |

(Continued)

OTHER PUBLICATIONS

International Search Report dated Sep. 20, 2016 in PCT/JP2016/074942 filed on Aug. 26, 2016.

(Continued)

*Primary Examiner* — Towfiq Elahi
(74) *Attorney, Agent, or Firm* — IPUSA, PLLC (57) ABSTRACT

In an operation device, when an operation body is pressed, a tilt of the operation body is detected from detection outputs of proximity sensors, and a pressed position of the operation body is detected by a touch sensor. A controller varies a threshold value according to the tilt of the operation body and the pressed position, and recognizes the pressing operation when a pressing distance of the operation body detected by the proximity sensors exceeds the threshold value.

12 Claims, 4 Drawing Sheets

(56) References Cited

U.S. PATENT DOCUMENTS

| | | | | |
|---|---|---|---|---|
| 2012/0319969 A1* | 12/2012 | Yamamoto | ......... | G06F 3/03547 |
| | | | | 345/173 |
| 2015/0091824 A1* | 4/2015 | Hori | ..................... | G06F 1/1694 |
| | | | | 345/173 |
| 2015/0106051 A1 | 4/2015 | Hatanaka et al. | | |
| 2015/0212589 A1 | 7/2015 | Hatanaka et al. | | |
| 2015/0296062 A1* | 10/2015 | Lee | .................. | G02F 1/133345 |
| | | | | 455/566 |
| 2016/0357317 A1* | 12/2016 | Kim | ..................... | G06F 3/0416 |
| 2017/0003776 A1* | 1/2017 | Shepelev | .............. | G06F 3/0412 |

FOREIGN PATENT DOCUMENTS

| | | |
|---|---|---|
| JP | 2009-258898 | 11/2009 |
| JP | 2013-020604 | 1/2013 |
| JP | 2014-119887 | 6/2014 |
| WO | 2008/065205 | 6/2008 |

OTHER PUBLICATIONS

Office Action dated Aug. 1, 2019 issued with respect to the corresponding European Patent Application No. 16859389.5.
Extended European Search Report for 16859389.5 dated Jul. 2, 2018.

* cited by examiner

OPERATION DEVICE

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2016/074942 filed on Aug. 26, 2016, which is based upon and claims the benefit of priority of the prior Japanese Patent Application No. 2015-211560 filed on Oct. 28, 2015, the entire contents of which are incorporated herein by reference.

BACKGROUND OF THE INVENTION

1. Field of the Invention

The present invention relates to an operation device that can reduce a difference in operation reaction forces felt by a finger or the like between a case in which a center of an operation body is pressed and a case in which a position away from the center is pressed.

2. Description of the Related Art

Operation devices for use in vehicles, and operation devices mounted on various electronic devices, include operation devices having a relatively large operation body provided with a touch sensor of an electrostatic capacitance type or the like. Such an operation device detects, by the touch sensor, a contact position of the finger, and a moving state of the finger, on an operation surface of the operation body. In addition, such an operation device is provided with a detection member that detects when the operation body is pressed, and a process of executing a predetermined input operation or the like is performed when the detection member detects that the operation body is pressed.

In this type of operation device, the operation body is tilted when the position away from the center of the operation body is pressed. For this reason, there is a problem in that the operation reaction force felt by the finger differs depending on the position of the operation body pressed by the finger.

Japanese Laid-Open Patent Publication No. 2013-20604 describes an operation device having a switch arranged under a central part of a touch pad that is pressed. FIG. 1 of Japanese Laid-Open Patent Publication No. 2013-20604 describes an operation in which the pressed touch pad is tilted using one end as a hinge. In this case, it is reported that the reaction forces felt by the finger when the switch is switched to an ON state differs between a case in which a position near the hinge is pressed and a case in which a position away from the center is pressed.

Accordingly, FIG. 2 and subsequent figures of Japanese Laid-Open Patent Publication No. 2013-20604 describe a structure in which the central part of the touch pad is supported by the switch, and a compression spring to push up the touch pad is provided at positions on both ends of the touch pad, with the switch interposed between the two ends. When the touch pad is pressed at a position away from the switch, the touch pad tilts using a part at the other end as the hinge. In this state, the compression spring located at a position on the pressed end compensates for the operation reaction force on the touch pad, so as to avoid a change in the reaction force depending on the pressed position on the touch pad.

The touch pad of the operation device described in Japanese Laid-Open Patent Publication No. 2013-20604 has the structure in which the central part is supported by the mechanical switch, and the two ends, having the switch interposed therebetween, are supported by the compression springs. This structure aims to compensate for a decrease in an operation resistance force when the touch pad is pressed at the position away from the central part, by elastic forces of the compression springs.

However, according to this structure, when the central part of the touch pad immediately above the switch, or a vicinity of the central part, is pressed, the reaction force of the switch and the elastic force of each of the compression springs all act simultaneously as the operation resistance force, as the touch pad is pushed in an approximately horizontal position. For this reason, the operation reaction force becomes considerably large when the touch pad is pressed in this manner. In other words, the compensation effect of the compression springs may be expected when the position away from the switch is pressed. On the contrary, the operation reaction force becomes excessively large when the position immediately above the switch or the position in the vicinity of the switch is pressed. Accordingly, the aim to generate a uniform reaction force regardless of the pressed position of the touch pad may not be achieved satisfactorily.

In addition, the structure described in Japanese Laid-Open Patent Publication No. 2013-20604 can be realized because the pushing of the touch pad is detected by the mechanical switch, and cannot be realized by a structure in which opposing electrodes are provided on both the operation body and a support part, to detect an approaching distance between the operation body and the support part from an electrostatic capacitance between the electrodes.

SUMMARY OF THE INVENTION

Accordingly, it is an object in one aspect of the embodiments to provide an operation device that can reduce a difference in operation reaction forces caused by different positions of an operation body that are pressed.

It is an object in another aspect of the embodiments to provide an operation device that can reduce inconsistencies in the operation reaction forces even in a case in which proximity sensors of an electrostatic capacitance type or the like are used.

According to one aspect of the present invention, an operation device includes a support part, an operation body, an elastic member supporting the operation body on the support part, a proximity sensor that detects an approaching distance of the operation body towards the support part, and a controller, wherein a tilt of the operation body with respect to the support part is detectable by the proximity sensor or a tilt detection sensor provided separately from the proximity sensor, and the controller varies a threshold value for judging that a pressing operation is made based on a detection output of the proximity sensor, according to the tilt of the operation body.

According to another aspect of the present invention, an operation device includes a support part, an operation body, an elastic member supporting the operation body on the support part, a proximity sensor that detects an approaching distance of the operation body towards the support part, a controller, and a touch sensor that detects a pressed position is provided on the operation body, wherein the controller varies a threshold value for judging that a pressing operation is made based on a detection output of the proximity sensor, according to the pressed position detected by the touch sensor.

Other objects and further features of the present invention will be apparent from the following detailed description when read in conjunction with the accompanying drawings.

DESCRIPTION OF THE PREFERRED EMBODIMENTS

Figure 1:
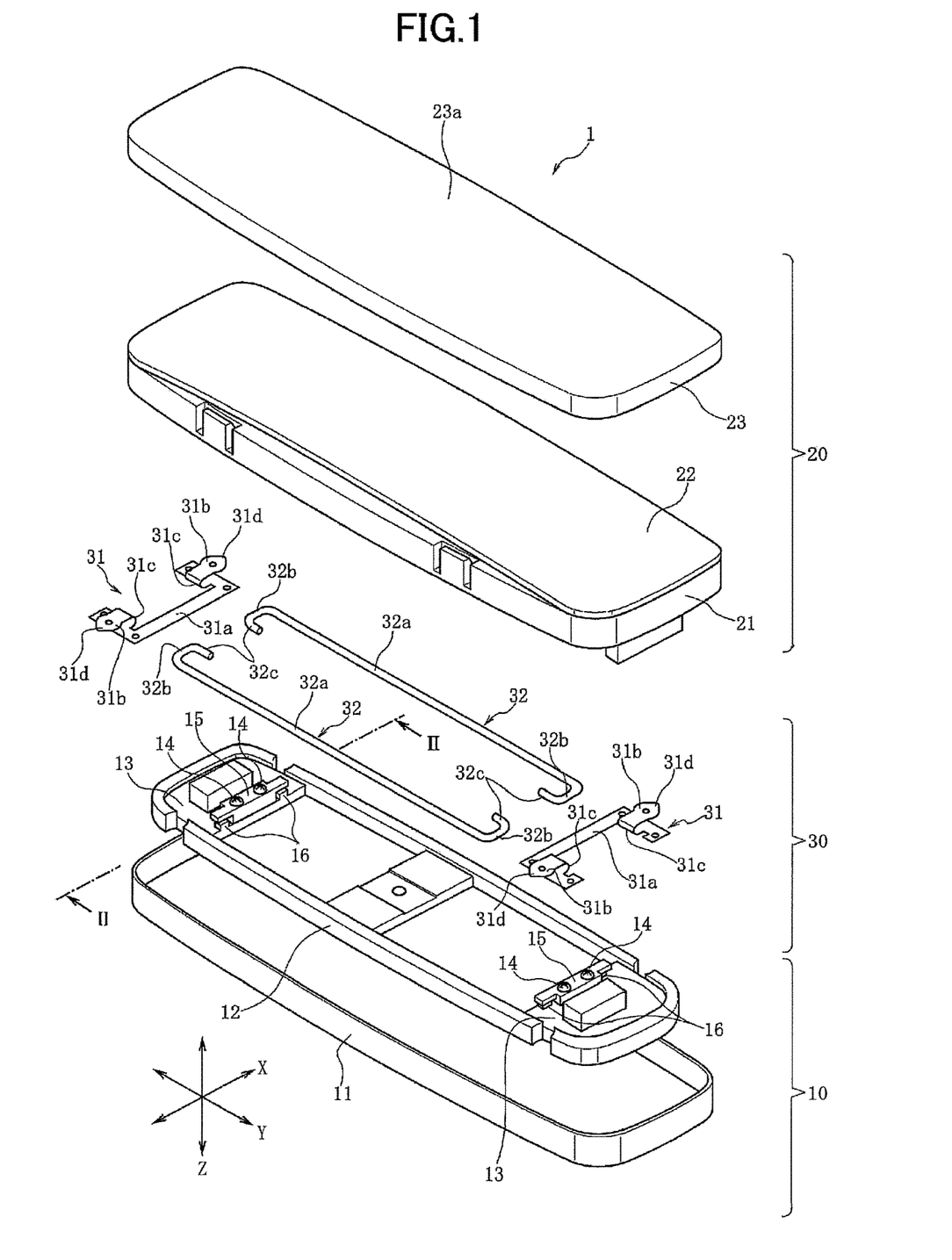
FIG. 1 is a disassembled perspective view of an operation device in a first embodiment of the present invention.
Figure 2:
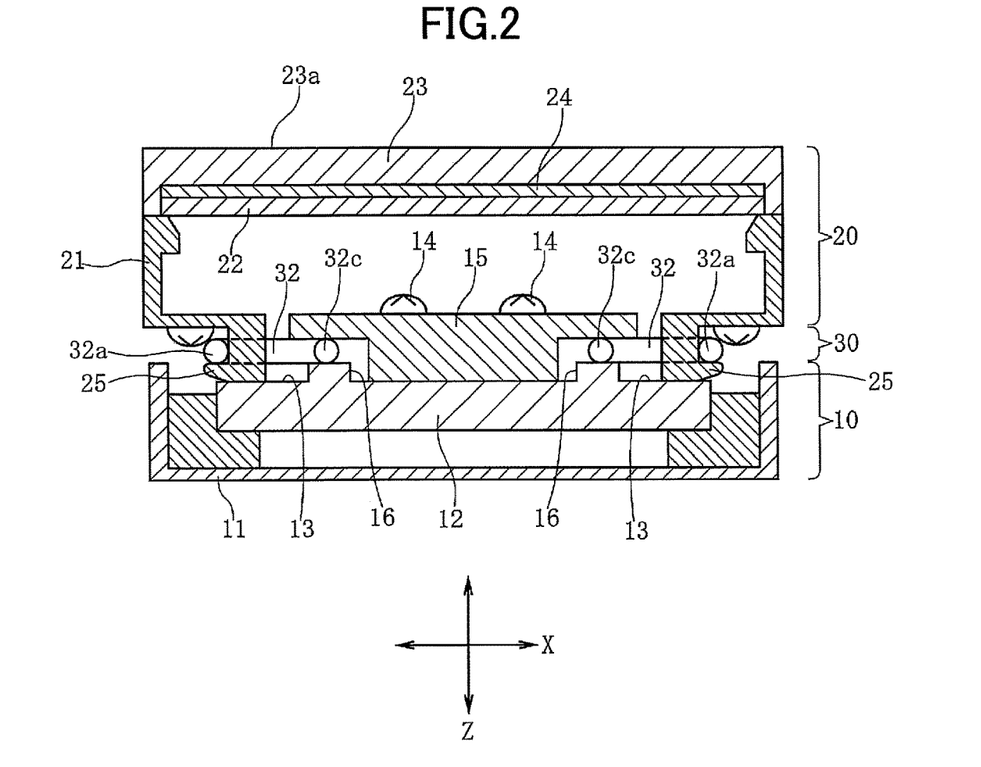
FIG. 2 is a cross sectional view of the operation device illustrated in FIG. 1, cut along a line II-II.

An operation device 1 illustrated in FIG. 1 and FIG. 2 has a support part 10, an operation body 20, and an elastic support mechanism 30 that supports the operation body 20 on the support part 10.

As illustrated in FIG. 1 and FIG. 2, the support part 10 has a base 11 having a casing shape with an open upper end, and a fixed frame 12 fixed inside the base 11. Each of the base 11 and the fixed frame 12 has a linear dimension along a vertical direction (Y-direction) greater than a linear dimension along a width direction (X-direction).

A spring support surface 13 is provided at both end parts of the fixed frame 12 along the vertical direction (Y-direction) of the fixed frame 12. A retainer 15 is fixed on each spring support surface 13 by screws 14, and torsion bearing parts 16 and 16 are formed between the fixed frame 12 and both end parts of the retainer 15 along the width direction (X-direction) of the retainer 15.

The operation body 20 has a display 22 that is supported on a movable member 21 and a movable member 21, and an operation panel 23 covering the display 22. As illustrated in FIG. 2, a touch sensor 24 is interposed between the display 22 and the operation panel 23.

The display 22 is formed by a color liquid crystal panel, an electroluminescence panel, or the like. The operation panel 23 is a transparent panel formed by a polycarbonate resin or an acrylic resin, and a surface of the operation panel 23 forms an operation surface 23a.

The touch sensor 24 has a plurality of translucent electrodes, formed by ITO or conductive nanowires, that are formed on a transparent substrate, such as a resin film or the like, and adjacent electrodes are insulated to set an electrostatic capacitance between the electrodes. When a conductor, such as a finger or the like, approaches the electrodes, an electrostatic capacitance is formed between the finger or the like and the electrodes. By applying pulsed driving power to driving electrodes in this state, and monitoring a current flowing through detecting electrodes, it is possible to detect a position to which the finger approached.

The operation panel 23 has an elongated shape having a linear dimension along the vertical direction (Y-direction) greater than a linear dimension along the width direction (X-direction). The display 22 and the touch panel 14 have approximately the same shape and the same area as the operation panel 23. A display screen of the display 22 is visible through the operation panel 23 from frontward of (above in these figures) the operation body 20. The finger that approaches or makes contact with a position on the operation surface 23a while viewing the display screen, is detected by the touch sensor so that it is possible to operate the operation panel 23 while viewing the display screen.

The elastic support mechanism 30 has a pair of first elastic members 31 and 31, and a pair of second elastic members 32 and 32. In addition, a projection extending in a Z-direction is formed on one of the support part 10 and the operation body 20, and a recess extending in the Z-direction is formed in the other of the support part 10 and the operation body 20. The projection is slidably inserted into the recess, to form an elevating guide mechanism that movably guides the operation body 20 on the support part 10 in the Z-direction.

The first elastic member 31 is formed by a leaf spring material. The first elastic member 31 has a fixed piece 31a, and elastic pieces 31b and 31b that are integrally formed on both sides of the fixed piece 31a in the width direction (X-direction) of the fixed piece 31a. The fixed piece 31a is fixed to the spring support surface 13 that is formed on the fixed frame 12. The elastic piece 31b is arranged so that a base end 31c and a free end 31b face the width direction (X-direction), and the elastic piece 31b exhibits an elastic restoring force due to bending deformation in the Z-direction.

The second elastic member 32 exhibits functions of both a torsion bar and a support link, and is formed by a metal rod or a metal line. The second elastic member 32 integrally has a movable connecting part 32a extending linearly in the vertical direction (Y-direction), U-shaped bent parts 32b and 32b formed at both ends of the movable connecting part 32a, and support connecting parts 32c and 32c forming end parts of the U-shaped bent parts 32b and 32b.

As illustrated in FIG. 2, each support connecting part 32c of the second elastic member 32 is supported by the torsion bearing part 16 that is provided on the support part 10. At the torsion bearing part 16, the support connecting part 32c does not positionally deviate in the Y-direction, but can move slightly in the X-direction, and is further supported to be rotatable around a Y axis.

As illustrated in FIG. 2, a connecting bearing part 25 is formed at a plurality of positions of the movable member 21 that is provided on the operation body 20. In the movable member 21, at the respective positions of the connecting bearing parts 25 that are separated by a gap in the X-direction, each connecting bearing part 25 forms a pair with another connecting bearing part 25 that is separated by a gap in the Y-direction. The movable connecting part 32a of the second elastic member 32 is held by the connecting bearing part 25. At the connecting bearing part 25, the movable connecting part 32a is supported to be rotatable around the Y axis without positionally deviating in the X-direction nor the Y-direction.

Figure 3:
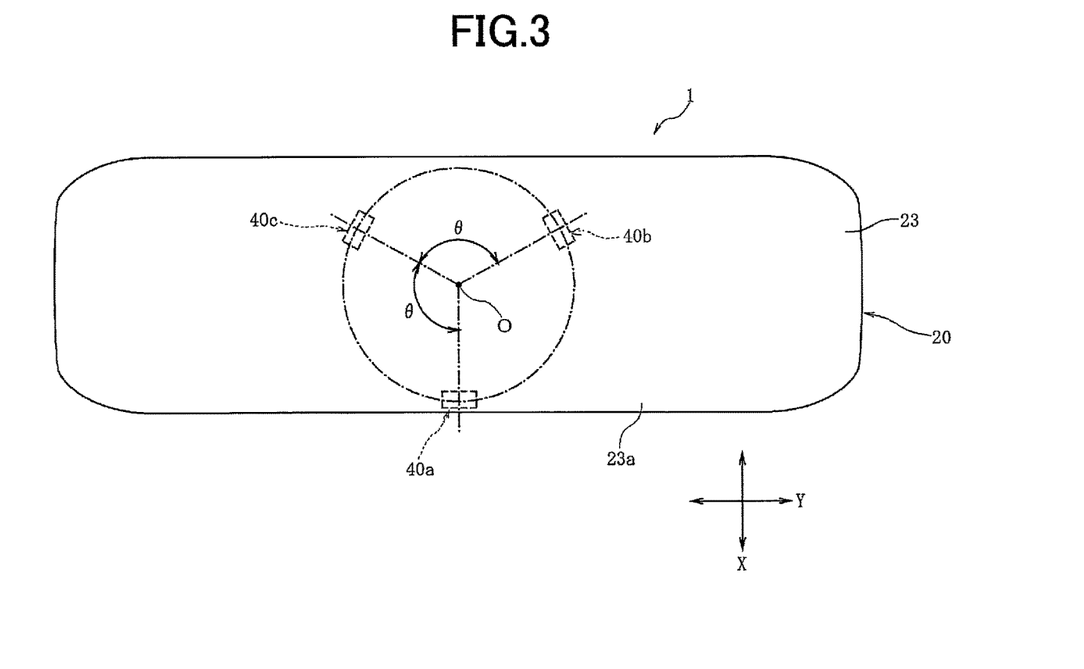
FIG. 3 is a plan view of the operation device illustrated in FIG. 1.
Figure 4A:
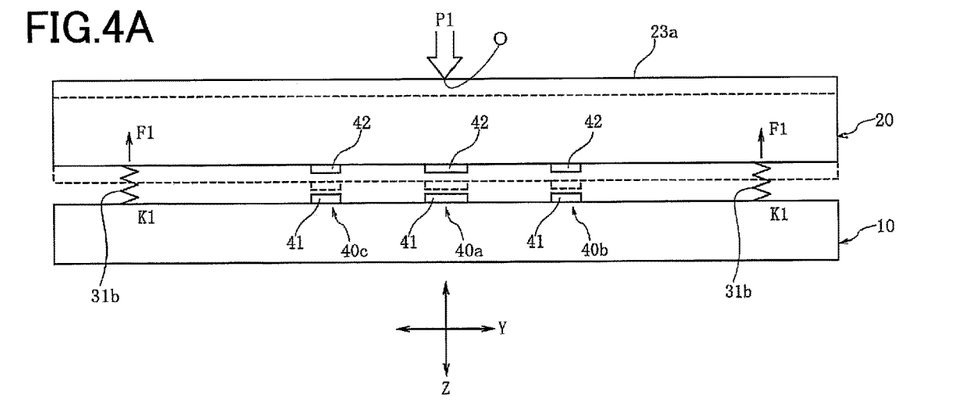
FIGS. 4A and 4B are diagrams for explaining a pressing operation of an operation body illustrated from a side.
Figure 4B:
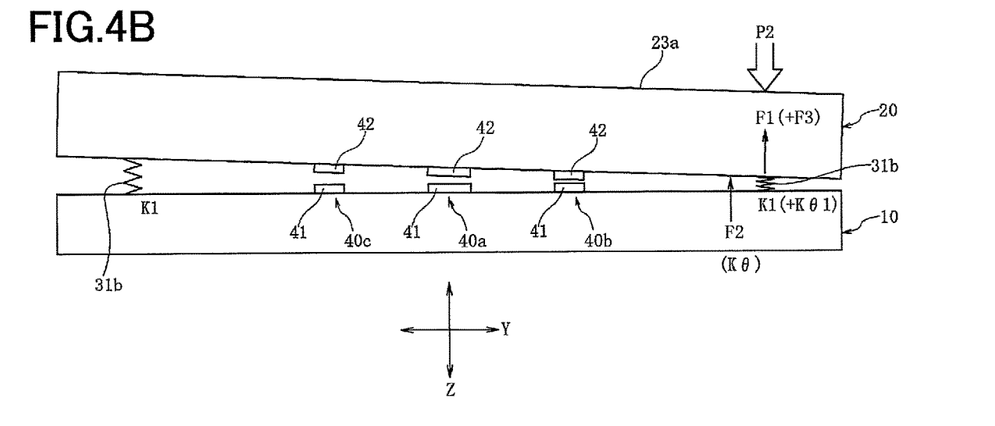

As illustrated in FIG. 3 and FIGS. 4A and 4B, a first proximity sensor 40a, a second proximity sensor 40b, and a third proximity sensor 40c are provided between the support par 10 and the operation body 20. Each of the proximity sensors 40a, 40b, and 40c has a fixed electrode 41 that is fixed on the fixed frame 12 of the support part 10, and a movable electrode 42 that is fixed on the movable member 21 of the operation body 20. Predetermined areas of the fixed electrode 41 and the movable electrode 42 opposed each other in the Z-direction. One of the fixed electrode 41 and the movable electrode 42 is a driving electrode, and the other of the fixed electrode 41 and the movable electrode 42 is a detecting electrode. By applying a pulsed driving current to driving electrode, and monitoring a current flowing through the detecting electrode, it is possible to detect a change in the electrostatic capacitance between the fixed electrode 41 and the movable electrode 42. Hence, it is possible to detect a change in an opposing distance between the fixed electrode 41 and the movable electrode 42 in the Z-direction.

FIG. 3 illustrates a center (center of gravity) O of the operation body 20 (operation surface 23a). The proximity sensors 40a, 40b, and 40c are arranged at a uniform opening angle θ=120 degrees with respect to the center O, and are also arranged on a concentric circle about the center O. The 3 proximity sensors 40a, 40b, and 40c do not need to have the uniform opening angle, and do not need to be arranged on the concentric circle about the center O. However, when the arrangement illustrated in FIG. 3 is used, it becomes easy to compute a tilt or the like of the operation body 20 from detection outputs of the 3 proximity sensors 40a, 40b, and 40c.

Figure 7:
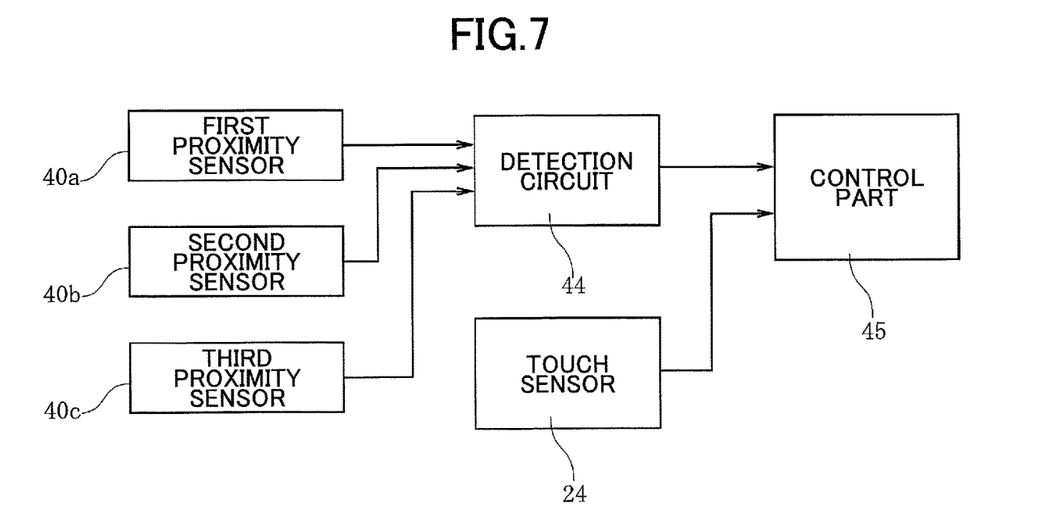
FIG. 7 is a circuit block diagram of the operation device in one embodiment of the present invention.

As illustrated in FIG. 7, the operation device 1 has a circuit structure including a detection circuit 44 that obtains the detection outputs of the first proximity sensor 40a, the second proximity sensor 40b, and the third proximity sensor 40c, and a control part (or controller) 45 that performs a computation process by obtaining an output from the detection circuit 44 and a detection output from the touch sensor 24.

The control part 45 may be formed by a circuit, a processor such as a CPU (Central Processing Unit), or the like. A memory (not illustrated) associated with the control part 45 may be provided within the control part 45 or may be connected to the control part 45. The memory may be formed by a non-transitory computer-readable storage medium that stores a program that is executed by the processor.

Next, an operation of the operation device 1 will be described.

As illustrated in FIG. 1 and FIG. 2, the operation body 20 is supported by the pair of second elastic members (functioning both as the torsion bar and the support link) 32 and 32 extending in the Y-direction, which is a longitudinal direction of the operation body 20. As illustrated in FIG. 2, the movable connecting part 32a of the second elastic member 32 is rotatably supported on the movable member 21 of the operation body 20, and the support connecting part 32c of the second elastic member 32 is supported by the torsion bearing part 16 that is formed on the fixed frame 12 of the support part 10, so that the support connecting part 32 is slidable in the X-direction and also rotatable.

The elevating guide mechanism described above is formed between the support part 10 and the operation body 20, and further, a link mechanism that controls the tilt of the operation body 20 is formed by the pair of support links (second elastic members) 32 and 32. Hence, the operation body 20 can easily perform an elevating operation in the Z-direction while maintaining a horizontal position.

The operation body 20 is supported from a lower side by elastic pieces 31b formed at 4 positions on the first elastic member 31. FIGS. 4A and 4B illustrate a spring constant K1 caused by bending deformation of the elastic piece 31b in the Z-direction, and illustrates an upward elastic restoring force F1 applied from each elastic piece 31b to the operation body 20 in the Z-direction. The elastic restoring force F1 is a variable that is proportional to an amount of deformation of the elastic piece 31b in the Z-direction.

As described above, the pair of second elastic members 32 functions as a pair of parallel links, and thus, when the center O or its vicinity of the operation body 20 is pressed with a pressing force P1 as illustrated in FIG. 4A, the operation body 20 approaches the support part 10 while maintaining the horizontal position without twisting the second elastic members 32. In this state, an operation reaction force acting on the finger that presses with the pressing force P1 according to calculation is 4×F1. That is, the spring constant of the operation reaction force is 4×K1.

The operation body 20 can easily perform the elevating operation in the Z-direction while maintaining the horizontal position due to the pair of second elastic members 32 and 32. However, due to a large size of the operation body 20 in the Y-direction, and a gap between the projection and the recess of the elevating guide mechanism causing play, the operation body 20 easily takes a tilted position with respect to the support part 10 when a downward pressing force P2 acts at an end part in the Y-direction of the operation surface 23a as illustrated in FIG. 4B. When the pressing force P2 acts immediately above the elastic pieces 31b and 31b approximately at the right side, the elastic pieces 31b and 31b apply an operation reaction force 2×F1 with respect to the finger that applies the pressing force P2. A spring constant of this operation reaction force is 2×K1.

Further, when the pressing force P2 is applied on the operation body 20 and the operation body 20 takes the tilted position illustrated in FIG. 4B, torsion is generated at the movable connecting part 32a of the pair of second elastic members 32, and a restoring force F2 of torsional elasticity acts on the operation body 20. A spring constant of the torsional elasticity of the second elastic member 32 that functions as the torsion bar is Kθ, and the restoring force F2 described above is a variable that is proportional to a twisting angle of the movable connecting part 32a.

If the second elastic members 32 and 32 were not provided, with respect to the operation reaction force (4×F1) for the case in which the pressing force P1 is applied in the vicinity of the center O, the operation reaction force (2×F1) for the case in which the pressing force P2 is applied at the end part in the Y-direction is reduced to approximately ½. However, by providing the second elastic members 32 and 32, it is possible to apply the operation reaction force (2×F1+2×F2) with respect to the finger that is applying the pressing force P2. Hence, it is possible to reduce a difference between the operation reaction force for the case in which the vicinity of the center O is pressed as illustrated in FIG. 4A, and the operation force for the case in which the end part in the Y-direction is pressed as illustrated in FIG. 4B.

The effect of reducing the difference between the operation positions is the same regardless of the pressed position on the operation surface 23a of the operation body 20. For example, in a case in which an intermediate position between the positions applied with the pressing forces P1 and P2 is pressed by the finger, the operation reaction force exhibited by the elastic pieces 31b becomes a value according to a span ratio (lever ratio) of each of the elastic pieces 31b located at positions separated in the Y-direction and the position that is pressed. In addition, because the operation reaction force exhibited by the second elastic member 32 is proportional to the twisted amount of the movable connecting part 32a, and the operation reaction force F2 changes according to a tilt angle of the operation body 20. Further, due to the torsion felt by the finger, the operation reaction force F2 also changes according to the position of the operation surface 23a pressed by the finger.

The elastic piece 31b provided on the first elastic member 31 illustrated in FIG. 1 and FIG. 2 generates the operation reaction force F1 (spring constant K1) in the Z-direction as illustrated in FIGS. 4A and 4B due to the bending deformation in the Z-direction. In addition, because the width direction of this elastic piece 31b is aligned in the Y-direction, when the operation body 20 tilts as illustrated in FIG. 4B, the elastic piece 31b undergoes the bending deformation, and it is possible to apply an operation reaction force F3 to the operation body 20 by a restoring force of the bending deformation. A spring constant $K\theta 1$ in this case is proportional to the tilt angle of the operation body 20.

In other words, the elastic piece 31b functions as both a first elastic member having the spring constant K1 due to bending in the Z-direction, and a second elastic member having the spring constant $K\theta 1$ according to the tilt of the operation body 20. One feature in one embodiment of the present invention is that both the first elastic member and the second elastic member are provided. However, it is possible not to use the second elastic member 32 (torsion bar), and use only the elastic piece 31b that functions as both the first elastic member and the second elastic member. Alternatively, it is possible to use the second elastic member 32 illustrated in FIG. 1, and use a compression coil spring or the like as the first elastic member.

An approaching distance between the support part 10 and the operation body 20, and the tilt angle of the operation body 20 are computed from the detection outputs of the first proximity sensor 40a, the second proximity sensor 40b, and the third proximity sensor 40c.

The approaching distance can be obtained by computing an average value of the detection outputs of each of the proximity sensors 40a, 40b, and 40c. When the average value matches or exceeds a threshold value that is set in the control part 45, it is judged that a pressing operation is made. For example, in a state in which the operation surface 23a is touched by the finger while viewing a menu display that is displayed on a display screen of the display 22 and this touch is detected by the touch sensor 24, it is judged that the pressing operation is made and the operation body 20 is pressed when the average value described above exceeds the threshold value. In this case, the process makes a transition to execute a program corresponding to a menu of the menu display selected by the touch of the finger.

Alternatively, among the detection values from the 3 proximity sensors 40a, 40b, and 40c, the measured value of the distance having a minimum value may be regarded as the approaching distance. In this case, it may be judged that the pressing operation is made when the approaching distance matches or exceeds a threshold value.

The approaching distance that is computed is not limited to the actual computed distance, and may be a value corresponding to the distance. For example, the detection values of the proximity sensors may be used as they are to judge the pressing operation, without computing the approaching distance from the detection values of the proximity sensors.

In addition, the control part 45 can compute the tilt of the operation body 20, from the detection outputs of the first proximity sensor 40a, the second proximity sensor 40b, and the third proximity sensor 40c.

For example, it is possible to compute a slant angle in the X-direction (slant angle around the Y axis by comparing an average value of the detection output of the second proximity sensor 40b and the detection output of the third proximity sensor 40c, with the detection output of the first proximity sensor 40a. In addition, it is possible to compute the slant angle in the Y-direction (slant angle around a X axis) by comparing the detection output of the second proximity sensor 40b and the detection output of the third proximity sensor 40c.

The control part 45 performs a control to vary the threshold value of the approaching distance for judging that the pressing operation is made, based on the computed value of the tilt of the operation body 20, and the position detected by the touch sensor 24 where the pressing force acts on the operation surface 23a.

The control part 45 sets a different threshold value according to the computed value of the tilt of the operation body 20, and the position where the pressing force acts. The control performed by the control part 45 may continuously vary the threshold value according to the amount of tilt of the operation body 20 and the change in the position where the pressing force acts, or may vary the threshold value in steps according to the amount of tilt of the operation body 20 and the change in the position where the pressing force acts.

Figure 6:
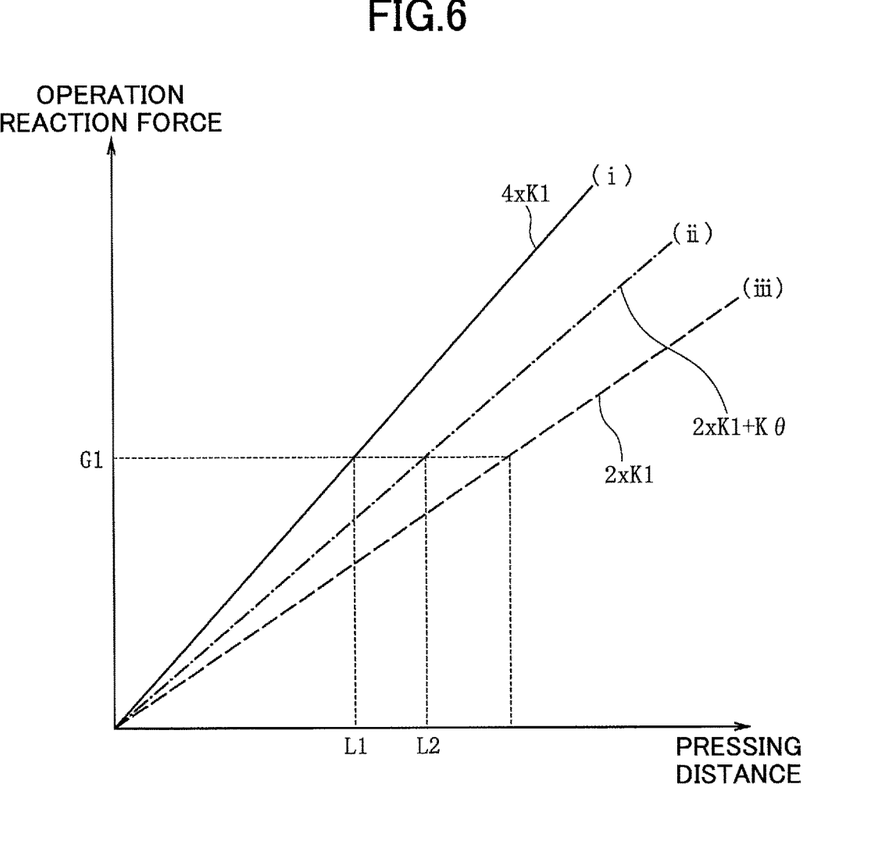
FIG. 6 is a graph illustrating a relationship of a pressing distance of the operation body and an operation reaction force.

In FIG. 6, an abscissa indicates a pressing distance (pressing amount) of the operation body 20 in the direction of the support part 10, and an ordinate indicates a magnitude of the operation reaction force felt by the finger. The pressing distance is detected by the 3 proximity sensors 40a, 40b, and 40c, and is obtained from an average value of the values of the approaching distances detected by the 3 proximity sensors 40a, 40b, and 40c, for example. Alternatively, the pressing distance is obtained from a minimum value of the values of the approaching distances detected by the 3 proximity sensors 40a, 40b, and 40c.

In FIG. 6, (i) indicates a relationship of the pressing distance and the operation reaction force when the vicinity of the center (center of gravity) O of the operation body 20 is pressed in the Z-direction with the pressing force P1, and the operation body 20 moves down approximately in the horizontal position without tilting, as illustrated in FIG. 4A. In this state, the operation reaction force applied to the operation body 20 is 4×F1, where F1 is a variable, and the spring constant in this case is 4×K1.

In FIG. 6, (ii) indicates a relationship of the pressing distance and the operation reaction force when the operation body 20 is pressed in the Z-direction with the pressing force P2 at a position immediately above the elastic pieces 31b on the right side in FIG. 4B at an intermediate point along the X-direction, as illustrated in FIG. 4B. In this state, the operation body 20 tilts, and the operation reaction force is 2×F1+2×F2. The operation reaction force F2 may be found by detecting the tilt of the operation body 20 and estimating the twisting angle of the second elastic member 32. The spring constant in this case becomes $2 \times K1+K\theta$ due to the effects of the second elastic member 32.

In FIG. 6, (iii) indicates, for reference purposes, an example in which the pressing force is P2 but the second elastic member 32 is not provided, and the operation reaction force is applied solely by the elastic piece 31b of the first elastic member 31. In this state, the operation reaction force is 2×K1, and the spring constant is 2×F1.

The control part 45 sets a pressing distance (approaching distance between the support part 10 and the operation body 20) L1 as the threshold value when the tilt of the operation body 20 is a prescribed value or less, and judges that the pressing operation is made when the pressing distance reaches L1 or exceeds L1. In this state, the relationship of the pressing distance and the operation reaction force becomes as illustrated by the graph (i) of FIG. 6, and the operation reaction force is G1 when the pressing distance is L1. For example, L1 is 0.5 mm, and the operation reaction force is 5 N (Newtons).

The operation device 1 is provided with a vibration generation device, and vibration is applied to the operation body 20 when the control part 45 judges that the pressing operation is made. Hence, when the operation reaction force becomes 5 N, the vibration is applied to the operator's finger pressing immediately above or the vicinity of the center O, so that the operator can feel that the pressing operation is performed.

When the position of the operation surface 23a of the operation body 20, away from the center O, is pressed, the operation body 20 does not move down in the horizontal position, and moves down in a tilted state, even though the second elastic members 32 and 32 function as the link mechanism. When it is judged from the detection outputs of the 3 proximity sensors 40a, 40b, and 40c that the operation body 20 is tilted, the threshold value of the pressing distance for judging that the pressing operation is made is varied according to the judged tilt angle and the value of the pressing position detected by the touch sensor 24. The variation of the threshold value is stored in the form of a table or a formula in the memory associated with the control part 45.

For example, when the tilt of the operation body 20 is detected, and it is detected from the detection output of the touch sensor 24 that the operation body 20 is pressed immediately above the elastic pieces 31b and 31b on the right side at the center position along the X-direction as illustrated in FIG. 4B, the control part 45 varies the threshold value of the pressing distance for judging that the pressing operation is made to L2. The threshold value L2 is set based on the graph (ii) of FIG. 6, and this graph is set based on the tilt angle of the operation body 20 computed from the detection outputs of the 3 proximity sensors 40a, 40b, and 40c.

In the graph (ii) of FIG. 6, the operation reaction force is set to approximately G1 when the pressing distance is the threshold value L2. Hence, the control part 45 sets the pressing distance as the threshold value L2, and judges that the pressing operation is made when the pressing distance reaches L2 or exceeds L2. In this state, the operation reaction force felt by the finger is approximately the same as that when the operation body 20 is pressed in the horizontal position.

When the pressing force applied to the operation body 20 is the vicinity of the center O illustrated in FIG. 4A and when the pressing force applied to the operation body 20 is the intermediate position at the end part illustrated in FIG. 4B, the pressing position can be detected from the detection output of the touch sensor 24, and the operation reaction force applied from the first elastic member 31 to the operation body 20 is computed. Further, the operation reaction force in these cases can also be computed from the tilt angle of the operation body 20 detected by the 3 proximity sensors 40a, 40b, and 40c. Based on the computed value of the operation reaction force, the relationship of the pressing distance and the operation reaction force illustrated in FIG. 6 is read from the memory, and the control part 45 sets an optimum threshold value for this case according to the pressing position and the tilt of the operation body 20. Accordingly, the difference in operation reaction forces can be reduced regardless of the pressed position, and the operation reaction force can preferably be made uniform.

Summarizing the above, the control part 45 performs a process to:

(1) Set the threshold value for judging that the pressing operation is made to L1, when it is judged from the detection outputs of the proximity sensors 40a, 40b, and 40c that the operation body 20 is pressed without being tilted; and (2) Set the threshold value for judging that the pressing operation is made (to L2, for example) from a graph or a relational expression according to reaction forces, when it is judged from the detection outputs of the proximity sensors 40a, 40b, and 40c that the operation body 20 is tilted, where the reaction forces include the reaction force estimated based on elastic restoring force acting in the Z-direction at the pressed position from the 4 elastic pieces 31b, and the reaction force estimated based on the elastic restoring force exhibited from the second elastic member 32 according to the twisted amount at the tilt angle.

In FIG. 6, (iii) indicates the example in which the operation reaction force F1 is set solely by the elastic force exhibited by by the 4 elastic pieces 31b in the Z-direction, and the operation reaction force in this case is considerably small compared to that of (i) in FIG. 6. Hence, it is confirmed that, by utilizing the torsional elasticity of the second elastic member 32, it is possible to compensate for the decrease in the operation reaction force when the operation body 20 is pressed at the position away from the center O. Accordingly, it is possible to obtain the reaction force G1 (for example, 5 N) that is estimated when the position away from the center O is pressed, without having to make the pressing distance considerably long.

Particularly when the elastic function of the torsion bar of the second elastic member 32 is used, the operation reaction force F2 becomes stronger as the tilt of the operation body 20 becomes larger, and it becomes possible to compensate for the operation reaction force when the tilt angle of the operation body 20 becomes large. In addition, by setting the threshold value for judging that the pressing operation is made, from the relationship of the computed value of the tilt angle of the operation body 20, and the torsional elasticity of the second elastic member 32 according to the tilt, it becomes possible to obtain approximately the same operation reaction force regardless of the position that is operated.

Figure 5:
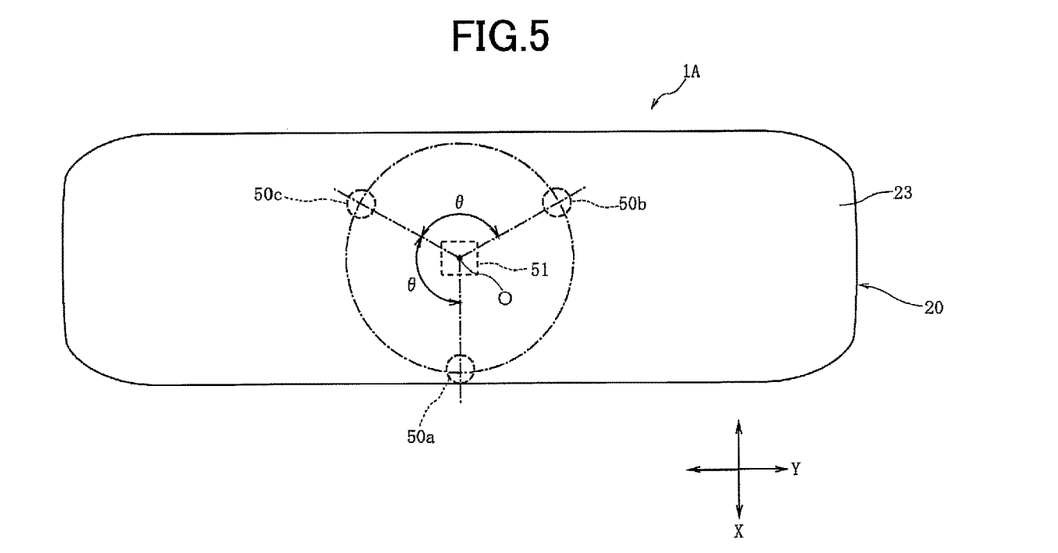
FIG. 5 is a plan view illustrating the operation device in a second embodiment of the present invention.

FIG. 5 illustrates an operation device 1A in a second embodiment of the present invention.

In this operation device 1A, 1 proximity sensor 51 is provided at the center O of the operation body 20. This proximity sensor 51 detects an opposing distance between the electrode provided on the support part 10 and the electrode provided on the operation body 20, according to a change in the electrostatic capacitance between the electrodes.

The operation device 1A is provided with tilt detection sensors 50a, 50b, and 50c at 3 peripheral positions of the proximity sensor 51. The tilt detection sensors 50a, 50b, and 50c are force sensors, for example. In this case, a reaction force in the Z-direction from the force sensor to the operation body 20 is preferably small.

The tilt detection sensors 50a, 50b, and 50c are the force sensors when contact type sensors are used. However, the tilt detection sensors 50a, 50b, and 50c are not limited to the contact type sensors, and non-contact type sensors, such as optical displacement sensors, ultrasonic sensors, magnetic sensors, or the like, may be used. In the case in which magnetic sensors are used, the magnetic sensors are provided on the support part 10, and a magnetic field generator, such as an electromagnetic coil, a magnet, or the like is provided on the operation body 20, to detect the tilt from a change in the distance between the operation sensor 20 and the magnetic sensors.

In this operation device 1A, the threshold value related to the pressing distance is varied according to the tilt angle of the operation body 20 detected by the 3 tilt detection sensors 50a, 50b, and 50c, and the detection output from the touch sensor 24. It is judged from a detection output of the proximity sensor 51 that the pressing operation is made when the pressing distance reaches the threshold value or exceeds the threshold value.

In one embodiment of the present invention, the operation reaction force in the Z-direction may be exhibited using only the first elastic member 31, that is, without using the second elastic member 32. In this case, the relationship of the pressing distance and the operation reaction force becomes as indicated by (iii) in FIG. 6. When the second elastic member 32 that exhibits the torsion elasticity according to the tilt angle of the operation body 20 is not provided, it is unnecessary to obtain the tilt angle of the operation body 20. In this case, the position where the operation body 20 is pressed may be detected from the detection output of the touch sensor 24, and the threshold value for judging that the pressed operation is made may be set according to the change in the pressed position.

Even in a case in which both the first elastic member and the second elastic member are used, it is possible not to detect the tilt of the operation body 20, and to vary the threshold value based solely on the information indicating the pressed position of the operation body 20.

The disclosed operation device may include a support part, an operation body, an elastic member supporting the operation body on the support part, a proximity sensor that detects an approaching distance between the operation body and the support part, and a controller, wherein a tilt of the operation body with respect to the support part is detectable by the proximity sensor or a tilt detection sensor provided separately from the proximity sensor, and the controller varies a threshold value for judging that a pressing operation is made based on a detection output of the proximity sensor, according to the tilt of the operation body.

In the disclosed operation device, the operation body may be provided with a touch sensor that detects a pressed position, and the controller may vary the threshold value according to the pressed position detected by the touch sensor, and the tilt of the operation body.

In the disclosed operation device, a plurality of proximity sensors may be provided, and the tilt of the operation body may be detected from the detection output of each of the plurality of proximity sensors. Alternatively, the tilt detection sensor may be a force sensor provided at a plurality of positions.

In the disclosed operation device, the elastic member is preferably provided with a plurality of first elastic members having a reaction force that increases according to the approaching distance of the operation body towards the support part, and a second elastic member having a reaction force that increases according to the tilt of the operation body. In this case, the second elastic member may be a torsion bar having a twisted amount that varies according to an amount of tilt of the operation body. For example, a link mechanism may be provided between the support part and the operation body and restricts the tilt of the operation body, and a support link that forms the link mechanism may function as the torsion bar.

The disclosed operation device may include a support part, an operation body, an elastic member supporting the operation body on the support part, a proximity sensor that detects an approaching distance of the operation body towards the support part, a controller, and a touch sensor that detects a pressed position is provided on the operation body, wherein the controller varies a threshold value for judging that a pressing operation is made based on a detection output of the proximity sensor, according to the pressed position detected by the touch sensor.

In the disclosed operation device, the threshold value may be set so that a pressing operation is judged as being made when a reaction force from the elastic member have values that are approximately identical between a case in which a center of the operation body is pressed and a case in which a position away from the center is pressed.

The disclosed operation device judges that the pressing operation is made when the detected distance of the proximity sensor becomes a predetermined distance, but the threshold value for making this judgment is varied according to the tilt of the operation body. Alternatively, the threshold value is varied according to the pressed position of the operation body. As a result, it is possible to reduce a difference in operation reaction forces when the pressing operation is judged as being made, between a case in which a center part of the operation body is pressed, and a case in which an end part of the operation body is pressed, and the operation reaction forces can preferably be made uniform.

In addition, by adding the torsion bar or the like having a reaction force that varies according to the amount of tilt of the operation body, it becomes easy to set the operation reaction forces when the pressing operation is made at different positions to approximately the same values.

Further, the present invention is not limited to the described embodiments, and various variations, modifications, and substitutions may be made without departing from the scope of the present invention.

What is claimed is:

1. An operation device comprising:
a support part;
an operation body;
an elastic member supporting the operation body on the support part;
a proximity sensor configured to detect an approaching distance of the operation body towards the support part; and
a controller coupled to the proximity sensor,
wherein a tilt of the operation body with respect to the support part is detectable by the proximity sensor or a tilt detection sensor that is provided separately from the proximity sensor,
wherein the controller performs a process including
setting an approaching distance as a threshold value for judging that a pressing operation with respect to the operation body is made when the detected approaching distance detected by the proximity sensor reaches the threshold value,
varying the threshold value according to the tilt of the operation body, and
judging that the pressing operation is made when the detected approaching distance reaches the varied threshold value varied by the varying, and
wherein the threshold value is set so that the pressing operation is judged as being made with respect to the operation body when a reaction force from the elastic member is configured to have values that are identical between a case in which a center of the operation body is pressed and a case in which a position away from the center is pressed.

2. The operation device as claimed in claim 1, wherein
the operation body includes a touch sensor that detects a pressed position, and
the controller varies the threshold value according to the pressed position detected by the touch sensor, and the tilt of the operation body.

3. The operation device as claimed in claim 1, wherein
the proximity sensor includes a plurality of sensors, and
the controller detects the tilt of the operation body based on a detection output of each of the plurality of sensors included in the proximity sensor.

4. The operation device as claimed in claim 1, wherein the tilt detection sensor is a force sensor that includes a plurality of sensors provided at a plurality of positions.

5. The operation device as claimed in claim 1, wherein the elastic member includes
a plurality of first elastic members having a reaction force that increases according to the approaching distance of the operation body towards the support part, and
a second elastic member having a reaction force that increases according to the tilt of the operation body.

6. The operation device as claimed in claim 5, wherein the second elastic member is a torsion bar having a twisted amount that varies according to an amount of tilt of the operation body.

7. The operation device as claimed in claim 6, further comprising:
a link mechanism provided between the support part and the operation body, and restricts the tilt of the operation body,
wherein the link mechanism includes a support link functions as the torsion bar.

8. An operation device comprising:
a support part;
an operation body;
an elastic member supporting the operation body on the support part;
a proximity sensor configured to detect an approaching distance of the operation body towards the support part;
a controller coupled to the proximity sensor; and
a touch sensor configured to detect a pressed position on the operation body,
wherein the controller performs a process including
setting an approaching distance as a threshold value for judging that a pressing operation with respect to the operation body is made when the detected approaching distance detected by the proximity sensor reaches the threshold value,
varying the threshold value according to the pressed position detected by the touch sensor, and
judging that the pressing operation is made when the detected approaching distance reaches the varied threshold value varied by the varying, and
wherein the threshold value is set so that the pressing operation is judged as being made with respect to the operation body when a reaction force from the elastic member is configured to have values that are identical between a case in which a center of the operation body is pressed and a case in which a position away from the center is pressed.

9. The operation device as claimed in claim 1, wherein the controller varies the threshold value so that the larger the tilt angle is the larger the varied threshold value becomes.

10. The operation device as claimed in claim 8, further comprising:
a tilt sensor configured to detect a tilt of the operation body with respect to the support part,
wherein the controller varies the threshold value so that the larger the tilt angle detected by the tilt sensor is the larger the varied threshold value becomes.

11. The operation device as claimed in claim 2, wherein the controller continuously varies the threshold value according to the tilt of the operation body and a change in position of the pressed position.

12. An operation device comprising:
a support part;
an operation body;
an elastic member supporting the operation body on the support part;
a proximity sensor configured to output a detection signal according to an approaching distance of the operation body towards the support part; and
a controller coupled to the proximity sensor,
wherein a tilt of the operation body with respect to the support part is detectable by the proximity sensor or a tilt detection sensor that is provided separately from the proximity sensor,
wherein the controller performs a process including
detecting the approaching distance of the operation body towards the support part based on the detection signal output from the proximity sensor,
setting an approaching distance as a threshold value for judging that a pressing operation with respect to the operation body is made when the detected approaching distance reaches the threshold value,
varying the threshold value according to the tilt of the operation body, and
judging that the pressing operation is made when the detected approaching distance reaches the varied threshold value, and
wherein the threshold value is set so that the pressing operation is judged as being made with respect to the operation body when a reaction force from the elastic member is configured to have values that are identical between a case in which a center of the operation body is pressed and a case in which a position away from the center is pressed.

* * * * *